(12) United States Patent
Lange et al.

(10) Patent No.: US 12,455,945 B2
(45) Date of Patent: Oct. 28, 2025

(54) DEVICE AND IN PARTICULAR A COMPUTER-IMPLEMENTED METHOD FOR CLASSIFYING DATA SETS

(71) Applicant: Robert Bosch GmbH, Stuttgart (DE)

(72) Inventors: Lukas Lange, Pforzheim (DE); Jannik Stroetgen, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 837 days.

(21) Appl. No.: 17/654,417

(22) Filed: Mar. 11, 2022

(65) Prior Publication Data

US 2022/0300750 A1 Sep. 22, 2022

(30) Foreign Application Priority Data

Mar. 16, 2021 (DE) .................. 10 2021 202 564.1

(51) Int. Cl.
| | | |
|---|---|---|
| *G06F 18/00* | (2023.01) | |
| *G06F 18/214* | (2023.01) | |
| *G06F 18/2413* | (2023.01) | |
| *G06F 18/2431* | (2023.01) | |

(52) U.S. Cl.
CPC ........ *G06F 18/2413* (2023.01); *G06F 18/214* (2023.01); *G06F 18/2431* (2023.01)

(58) Field of Classification Search
CPC . G06F 18/214; G06F 18/2431; G06F 18/2413
See application file for complete search history.

(56) References Cited

U.S. PATENT DOCUMENTS

| | | | | |
|---|---|---|---|---|
| 11,210,605 | B1* | 12/2021 | Gupta | ..................... G06F 17/18 |
| 2018/0018587 | A1* | 1/2018 | Kobayashi | ............. G06N 20/00 |
| 2018/0060738 | A1* | 3/2018 | Achin | ..................... G06N 20/00 |
| 2018/0157971 | A1* | 6/2018 | Fusi | ........................ G06N 7/01 |
| 2019/0377984 | A1* | 12/2019 | Ghanta | .............. G06F 18/2155 |
| 2020/0380378 | A1* | 12/2020 | Moharrer | ............... G06N 20/20 |
| 2021/0390458 | A1* | 12/2021 | Blumstein | ............. G06N 20/00 |
| 2022/0044078 | A1* | 2/2022 | Sathe | ..................... G06N 20/00 |

(Continued)

OTHER PUBLICATIONS

Vu et al., "Exploring and Predicting Transferability Across NLP Tasks," Cornell University, 2020, pp. 1-45. <https://arxiv.org/pdf/2005.00770.pdf> Downloaded Mar. 9, 2022.

(Continued)

*Primary Examiner* — Barbara M Level
(74) *Attorney, Agent, or Firm* — NORTON ROSE FULBRIGHT US LLP

(57) ABSTRACT

A device and method for classifying data sets are provided. A model for solving a task, and training data sets are predefined. For each of the training data sets, a trained model for solving the task is determined by pretraining the model on the training data set and training the model on a reference training data set. A trained reference model for solving the task is determined by training the model on the reference training data set without pretraining with the plurality of training data sets. The trained models are classified as suitable or unsuitable for the pretraining as a function of a deviation of their particular quality from a reference quality. In the plurality of training data sets, nearest neighbors of a data set are determined. Each data set is classified as suitable or unsuitable for the pretraining.

7 Claims, 3 Drawing Sheets

(56) References Cited

U.S. PATENT DOCUMENTS

2022/0114473 A1\*  4/2022  Awasthy ................ G06N 3/045
2023/0229965 A1\*  7/2023  Ishikawa ................ G06N 3/096
                                                   706/12

OTHER PUBLICATIONS

Zamir, et al.: "Taskonomy: Disentangling Task Transfer Learning", Proceedings of the 2018 IEEE/CVF Conference on Computer Vision and Pattern Recognition, (2018), pp. 3712-3722; 001: https://doi.org/10.1109/CVPR.2018.00391.

\* cited by examiner

DEVICE AND IN PARTICULAR A COMPUTER-IMPLEMENTED METHOD FOR CLASSIFYING DATA SETS

CROSS REFERENCE

The present application claims the benefit under 35 U.S.C. § 119 of German Patent Application No. DE 10 2021 202 564.1 filed on Mar. 16, 2021, which is expressly incorporated herein by reference in its entirety.

FIELD

The present invention is directed to a device and an in particular computer-implemented method for classifying data sets.

BACKGROUND INFORMATION

Artificial intelligence algorithms require very large quantities of training data. One option for reducing the quantity of necessary training data is so-called "transfer learning."

In transfer learning, pretrained models are utilized and subsequently applied to the actual main task. The need for labeled data for the main task is thus reduced, since the pretrained model generally includes applicable knowledge. For optimal success, models that are pretrained on data that are as similar as possible should be used. Similarity measures or distance measures, for example, are used to determine this similarity. Vu et al., Exploring and Predicting Transferability across NLP Tasks, 2020, https://arxiv.org/abs/2005.00770, describe such a distance measure.

With the aid of distance measures, an ordering of available data sets may be created, and a most closely related data set, i.e., a data set having a minimum distance from a target data set, may be found for training for the main task and used for pretraining the model.

SUMMARY

In accordance with an example embodiment of the present invention, a method, in particular a computer-implemented method for classifying training data, provides that a model for solving a task is predefined, a plurality of training data sets being predefined, for each training data set from the plurality of training data sets, a trained model for solving the task being determined by pretraining the model on this training data set and training the model on a reference training data set, a trained reference model for solving the task being determined by training the model on the reference training data set without pretraining with the plurality of training data sets, for each trained model a quality of solving the task being determined, for the trained reference model a reference quality of solving the task being determined, the trained models being classified in particular as suitable or unsuitable for the pretraining as a function of a deviation of their particular quality from the reference quality, in the plurality of training data sets, nearest neighbors of a data set being determined, either the data set being classified in particular as suitable or unsuitable for the pretraining as a function of how the models, which have been trained with the nearest neighbors, are classified, or the nearest neighbors of the data set being classified in particular as suitable for the pretraining. The first training data sets are candidates with which transfer experiments are carried out. These transfer experiments include a pretraining on selected data sets (the first training data sets) and a subsequent training on a main task (the reference training data set). In this case, a positive transfer means that performance achieved by the pretraining during the training of the main task is better compared to the training of the main task without pretraining. On the one hand, for a new, unknown data set it is predicted whether or not the data set is suitable for the pretraining. On the other hand, for an unknown data set, training data sets that are suitable or unsuitable for the pretraining are predicted.

For a training of the model, in one aspect of the present invention, it is provided that the model for solving the task is pretrained with the data set when this data set is classified as suitable for this purpose by the classifier, and that otherwise the model for solving the task is not pretrained with the data set. When the data set is selected, it is used for the pretraining. The model may subsequently be further trained on the reference data set.

For a training of the model, in one aspect of the present invention, it is provided that the model is pretrained with at least one training data set, which for the data set is classified as suitable for the pretraining, and that the model for solving the task in particular is subsequently trained with the data set. In this case, the selected training data set(s) is/are used for the pretraining.

In accordance with an example embodiment of the present invention, it may be provided that for each training data set of the plurality of training data sets, at least one distance from the data set is determined, either a predefined number of training data sets from the plurality of training data sets, whose distance is less than the other of the training data sets from the plurality of training data sets, being determined as nearest neighbors, or the training data sets from the plurality of training data sets, whose distance is less than a predefined distance, being determined as nearest neighbors. By use of the distance, each training data set is either associated or not associated with the nearest neighbors.

In accordance with an example embodiment of the present invention, for each training data set of the plurality of training data sets, a plurality of distances from the data set is preferably determined using various distance measures, the training data sets from the plurality of training data sets, for which at least one distance from the plurality of distances is less than the predefined distance, being determined as nearest neighbors. The nearest neighbors may differ as a function of the distance measure used. By use of the various distance measures, each training data set is evaluated based on the plurality of distances. This allows an incorporation of multiple different distance measures. As a result, a training data set may be associated with the nearest neighbor based on a distance measure, even if this were not the case based on some other distance measure, if it were used alone.

In accordance with an example embodiment of the present invention, a device for classifying data sets is designed to carry out the method.

In accordance with an example embodiment of the present invention, the device preferably includes a classifier and a training unit, the classifier being designed to classify a data set, the training unit being designed to determine a model for solving a task, which is trained or pretrained with the data set, when the classifier classifies the data set as suitable for this purpose, and otherwise to determine the model without training or pretraining with the data set.

In accordance with an example embodiment of the present invention, a computer program includes computer-readable instructions, and the method runs when the computer-readable instructions are executed by a computer.

Further advantageous specific embodiments of the present invention result from the following description and the figures.

DETAILED DESCRIPTION OF EXAMPLE EMBODIMENTS

Figure 1:
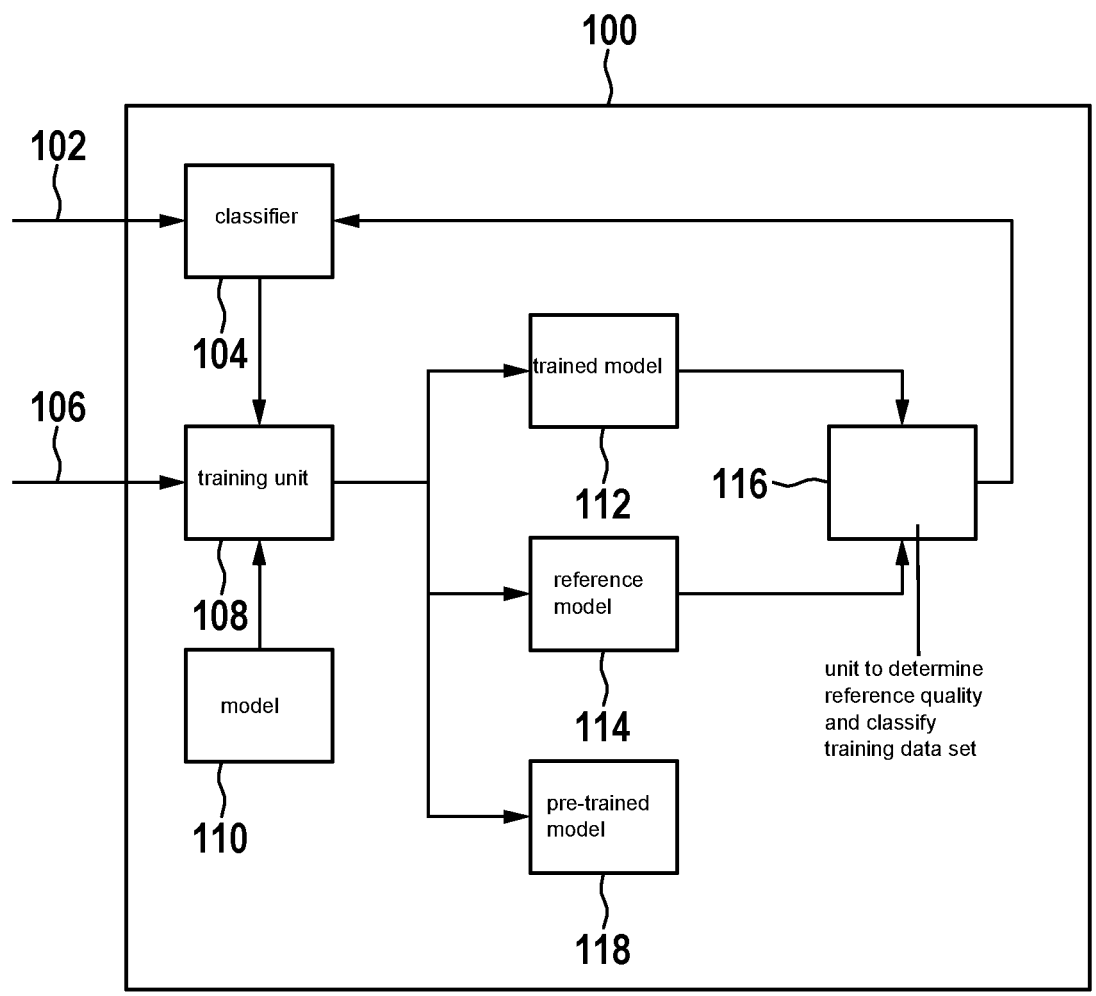
FIG. 1 shows a schematic illustration of a device for classifying data sets, in accordance with an example embodiment of the present invention.

FIG. 1 schematically illustrates a device 100 for classifying data sets. In the example, data sets are training data sets, reference data sets, or unknown data sets. Data sets may be labeled so that a supervised training is possible. In the example, a data set includes a plurality of embeddings. In the example, an embedding numerically or alphanumerically represents a digital image, metadata for same, or a portion of a corpus, i.e., a text.

Device 100 includes an input 102 for a data set, and a classifier 104 that is designed to classify the data set.

Device 100 includes an input 106 for a training data set, and a training unit 108 that is designed to determine a trained model 112 from a model 110 for solving a task by pretraining on the training data set and training on a reference data set. Training unit 108 is designed to determine a reference model 114 from model 110 by training on the reference data set without pretraining on the training data set.

Device 100 includes a unit 116 that is designed to determine a reference quality of reference model 114 and a quality of trained model 112 for solving the task. Unit 116 is designed to classify the training data set, with which trained model 112 has been pretrained, as suitable or unsuitable for the pretraining as a function of a deviation of the quality from the reference quality. In the example, the training data set is classified as suitable for the pretraining when the quality is better than the reference quality. In the example, the training data set is classified as unsuitable for the pretraining when the quality is less than the reference quality. In the example, the training data set is classified as unsuitable for the pretraining when the quality is the same as the reference quality. In the latter case, it may also be provided to classify the training data set as neutral.

Classifier 104 is designed to classify the data set as a function of how model 112, which is trained with the training data set, is classified.

Device 100 is designed to classify a plurality of training data sets in this way.

In the example, classifier 104 includes a k-th nearest neighbor classifier that is designed to determine a number k of nearest neighbors of the data set from the plurality of training data sets.

In one example, classifier 104 is designed to classify the data set as suitable or unsuitable for pretraining model 110 for a training on the reference data set, as a function of how the nearest neighbors of the data set are classified. In the example, model 110 is an artificial neural network that is trainable with supervision, using the data sets, to determine a solution for a task.

In this example, training unit 108 is designed to determine a model 118 that is pretrained with the data set and trained with the reference data set when the data set is classified as suitable for this purpose. Training unit 108 may be designed to otherwise provide no pretraining, or to provide pretraining with some other data set.

In one example, classifier 104 is designed to determine the number k of nearest neighbors that are classified as suitable for pretraining model 110 for a training on the data set.

In this example, training unit 108 is designed to determine a model 118 that is pretrained with at least one of the training data sets that have been determined as nearest neighbors, and trained with the data set.

Device 108 may be designed to output the number k of nearest neighbors and/or the training data sets that have been determined as nearest neighbors. Device 108 may be designed to output the nearest neighbors sorted according to their distance from the data set.

Device 100 is designed to carry out one or both of the methods described below.

Figure 2:
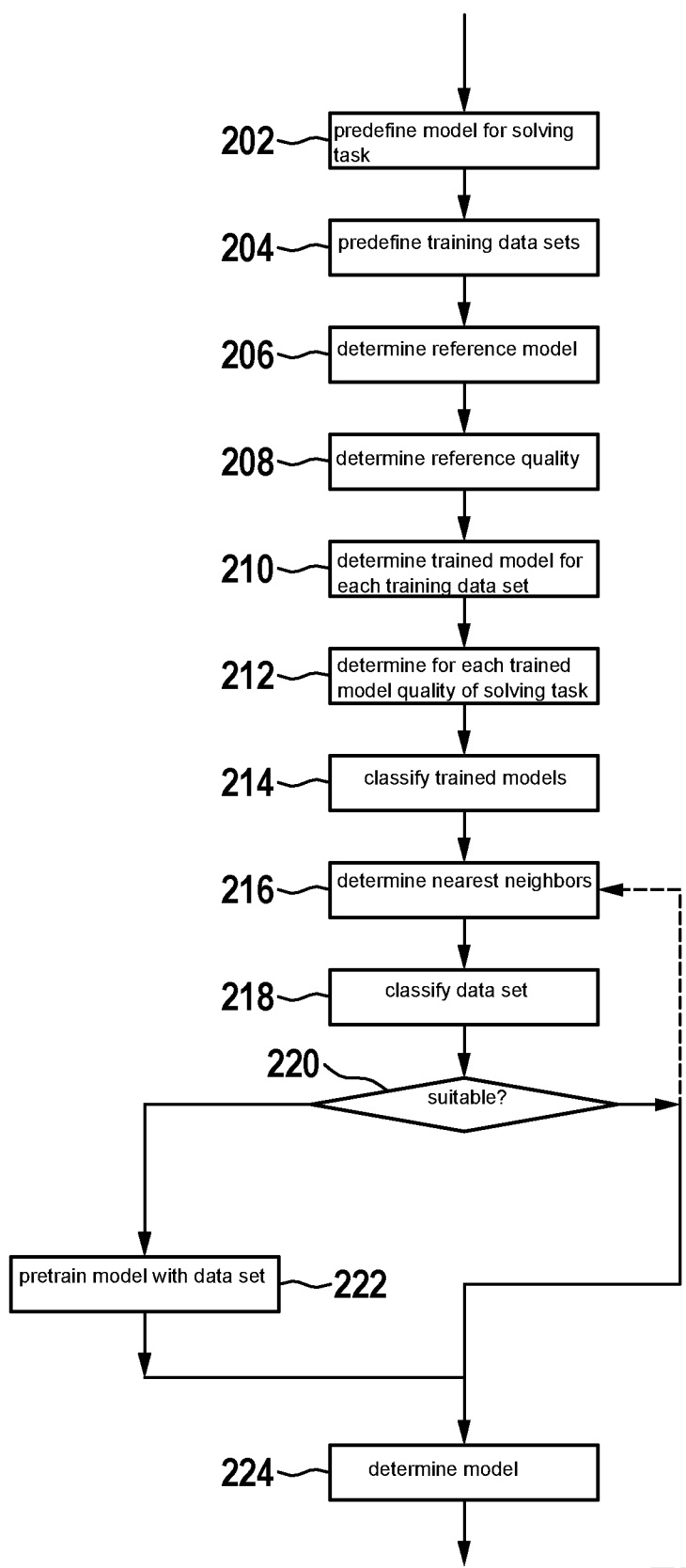
FIG. 2 shows a first method for classifying data sets, in accordance with an example embodiment of the present invention.

A first method for classifying the data set is described with reference to FIG. 2. By use of the first method, it is established whether or not the data set is suitable for the pretraining. Optionally, pretraining is carried out with the data set when it is suitable for this purpose.

Model 110 for solving the task is predefined in a step 202.

The plurality of training data sets is predefined in a step 204.

The reference model for solving the task is determined by training model 110 on the reference training data set, without pretraining with the plurality of training data sets, in a step 206.

A reference quality of solving the task is determined for the reference model thus trained, in a step 208.

For each training data set from the plurality of training data sets, one trained model 112 for solving the task is determined in a step 210 by pretraining model 110 on this training data set, and training model 110 on the reference training data set.

For each model 112 thus trained, a quality of solving the task is determined in a step 212.

Models 112 thus trained are classified in particular as suitable or unsuitable for the pretraining in a step 214 as a function of a deviation of their quality from the reference quality.

In the plurality of training data sets, nearest neighbors of the data set are determined in a step 216.

In the example, at least one distance from the data set is determined for each training data set of the plurality of training data sets.

It may be provided that a predefined number of training data sets from the plurality of training data sets, whose distance from the data set is less than the other of the training data sets from the plurality of training data sets, are determined as nearest neighbors.

It may be provided that the training data sets from the plurality of training data sets are determined as nearest neighbors whose distance is less than a predefined distance.

By use of the distance, for example each training data set is either associated or not associated with the nearest neighbors.

Multiple distance measures may be used. For each training data set of the plurality of training data sets, a plurality of distances from the data set may be determined using various distance measures. In this example, the training data sets from the plurality of training data sets are determined as nearest neighbors, for which the at least one distance from the plurality of distances is less than the predefined distance.

The different distance measures may be predefined or may be selectable by a user.

The data set is classified in a step 218 as a function of how models 112, which have been trained with the nearest neighbors, are classified. The data set is classified in particular either as suitable or unsuitable for the pretraining.

It is optionally checked in a step 220 whether the data set is classified as suitable for the pretraining.

If the data set is classified as suitable for the pretraining, a step 222 is carried out. Otherwise, it may be provided that step 216 is carried out for some other data set, in particular until a data set is suitable for the pretraining, or that a step 224 is carried out without the model being pretrained.

Model 110 is pretrained with the data set in step 222. Step 224 is subsequently carried out.

Model 118 that is pretrained on the data set and further trained on the reference data set is determined in step 224. If no data set is selected, it may be provided that model 118 is determined by training on the reference data set without pretraining.

Step 224 is optional. It may be provided that model 118, which is pretrained only on the data set without further training on the reference data set, is determined.

Figure 3:
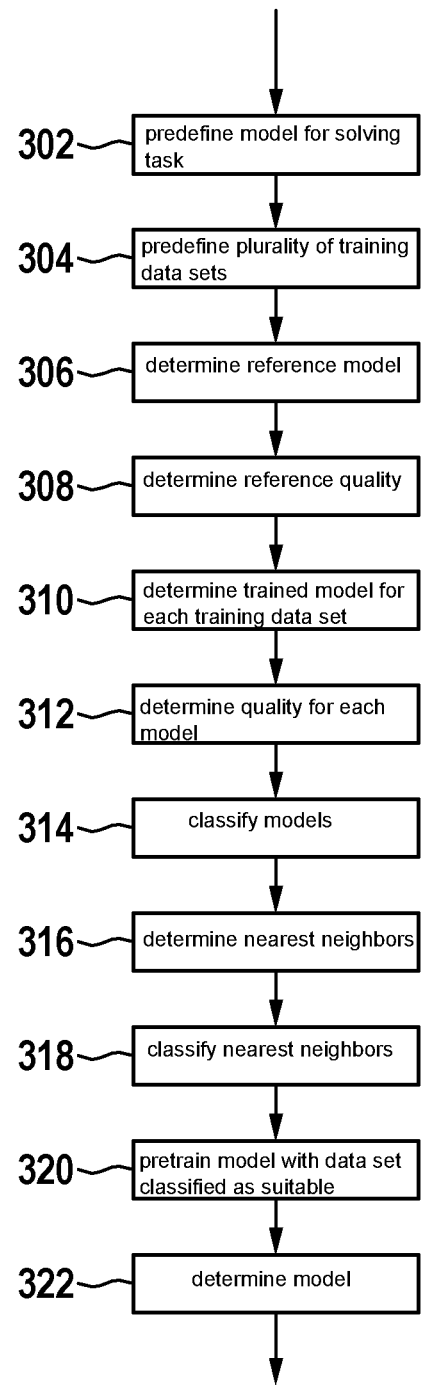
FIG. 3 shows a second method for classifying data sets.

A second method for classifying the data set is described with reference to FIG. 3. By use of the second method, it is established which training data sets from a plurality of training data sets are suitable for the pretraining when the data set is used for training model 110 for the task. Optionally, the pretraining is carried out with at least one of the training data sets that are suitable for this purpose.

Model 110 for solving the task is predefined in a step 302.

The plurality of training data sets is predefined in a step 304.

The reference model for solving the task by training model 110 on the reference training data set without pretraining with the plurality of training data sets is determined in a step 306.

A reference quality of solving the task is determined for the reference model thus trained in a step 308.

For each training data set from the plurality of training data sets, a trained model 112 for solving the task is determined in each case in a step 310 by pretraining model 110 on this training data set, and training model 110 on the reference training data set.

For each model 112 thus trained, a quality of solving the task is determined in a step 312.

Models 112 thus trained are classified in particular as suitable or unsuitable for the pretraining in a step 314 as a function of a deviation of their quality from the reference quality.

In the plurality of training data sets, nearest neighbors of the data set are determined in a step 316.

In the example, at least one distance from the data set is determined for each training data set of the plurality of training data sets.

It may be provided that the training data sets from the plurality of training data sets are determined as nearest neighbors whose distance is less than a predefined distance.

By use of the distance, for example each training data set is either associated or not associated with the nearest neighbors.

Multiple distance measures may be used. For each training data set of the plurality of training data sets, a plurality of distances from the data set may be determined using various distance measures. In this example, the training data sets from the plurality of training data sets are determined as nearest neighbors, for which at least one distance from the plurality of distances is less than the predefined distance.

The different distance measures may be predefined or may be selectable by a user.

The nearest neighbors of the data set are classified as suitable for the pretraining in a step 318.

Model 110 is optionally pretrained with at least one training data set, which for the data set is classified as suitable for the pretraining, in a step 320.

Model 118 for solving the task, which is pretrained with the at least one training data set and trained with the data set, is optionally determined in a step 322.

Step 322 is optional. It may be provided that model 118, which is pretrained only on the at least one training data set without further training on the data set, is determined.

Instead of determining model 118 which is pretrained and trained in this way, it may be provided to output a number or identification of the training data sets for this purpose. The training data sets may be output in the order according to their distance from the data set. The training data sets are preferably ordered according to their suitability for contributing to improvement of the quality of solving the task by a pretraining. The best suited training data set is preferably listed first in the ordering.

What is claimed is:

1. A computer-implemented method for classifying data sets, the method comprising:
   predefining a model for solving a task;
   predefining a plurality of training data sets;
   defining, for each training data set from the plurality of training data sets, a respective trained model for solving the task by pretraining the model on the training data set and training the model on a reference training data set;
   determining a trained reference model for solving the task by training the model on the reference training data set without pretraining with the plurality of training data sets;
   determining, for each respective trained model, a respective quality of solving the task;
   determining, for the trained reference model, a reference quality of solving the task;
   classifying each respective trained model as suitable or unsuitable for the pretraining as a function of a deviation of the respective quality from the reference quality;
   determining, in the plurality of training data sets, nearest neighbors of a data set of the plurality of training data sets; and
   either classifying the data set as suitable or unsuitable for the pretraining as a function of how the trained models, which have been trained with the nearest neighbors, are classified, or classifying the nearest neighbors of the data set as suitable for the pretraining, wherein for training of the model, the model is pretrained with at least one of the training data sets, which is classified as suitable for the pretraining, and the model for solving the task is subsequently trained with the data set.

2. A computer-implemented method for classifying data sets, the method comprising:
   predefining a model for solving a task;
   predefining a plurality of training data sets;
   defining, for each training data set from the plurality of training data sets, a respective trained model for solving the task by pretraining the model on the training data set and training the model on a reference training data set;

determining a trained reference model for solving the task by training the model on the reference training data set without pretraining with the plurality of training data sets;

determining, for each respective trained model, a respective quality of solving the task;

determining, for the trained reference model, a reference quality of solving the task;

classifying each respective trained model as suitable or unsuitable for the pretraining as a function of a deviation of the respective quality from the reference quality;

determining, in the plurality of training data sets, nearest neighbors of a data set of the plurality of training data sets; and either classifying the data set as suitable or unsuitable for the pretraining as a function of how the trained models, which have been trained with the nearest neighbors, are classified, or classifying the nearest neighbors of the data set as suitable for the pretraining, wherein for training of the model, the model is pretrained for solving the task with the data set when the data set is classified, by a classifier, as suitable for the pretraining, and otherwise the model for solving the task is not pretrained with the data set.

3. A computer-implemented method for classifying data sets, the method comprising:

predefining a model for solving a task;

predefining a plurality of training data sets;

defining, for each training data set from the plurality of training data sets, a respective trained model for solving the task by pretraining the model on the training data set and training the model on a reference training data set;

determining a trained reference model for solving the task by training the model on the reference training data set without pretraining with the plurality of training data sets;

determining, for each respective trained model, a respective quality of solving the task;

determining, for the trained reference model, a reference quality of solving the task;

classifying each respective trained model as suitable or unsuitable for the pretraining as a function of a deviation of the respective quality from the reference quality;

determining, in the plurality of training data sets, nearest neighbors of a data set of the plurality of training data sets; and either classifying the data set as suitable or unsuitable for the pretraining as a function of how the trained models, which have been trained with the nearest neighbors, are classified, or classifying the nearest neighbors of the data set as suitable for the pretraining, wherein for each training data set of the plurality of training data sets, at least one distance from the data set is determined, either a predefined number of training data sets from the plurality of training data sets being determined as nearest neighbors, whose distance is less than the other of the training data sets from the plurality of training data sets, or the training data sets from the plurality of training data sets being determined as nearest neighbors, whose distance is less than a predefined distance.

4. The method as recited in claim 3, wherein for each training data set of the plurality of training data sets, a plurality of distances from the data set is determined using various distance measures, the training data sets from the plurality of training data sets being determined as nearest neighbors, for which at least one distance from the plurality of distances is less than the predefined distance.

5. A computer-implemented device for classifying data sets, the computer-implemented device having a processor that executes computer-readable instructions configured to:

predefine a model for solving a task;

predefine a plurality of training data sets;

define, for each training data set from the plurality of training data sets, a respective trained model for solving the task by pretraining the model on the training data set and training the model on a reference training data set;

determine a trained reference model for solving the task by training the model on the reference training data set without pretraining with the plurality of training data sets;

determine, for each respective trained model, a respective quality of solving the task;

determine, for the trained reference model, a reference quality of solving the task;

classify each respective trained model as suitable or unsuitable for the pretraining as a function of a deviation of the respective quality from the reference quality;

determine, in the plurality of training data sets, nearest neighbors of a data set of the plurality of training data sets; and either classify the data set as suitable or unsuitable for the pretraining as a function of how the trained models, which have been trained with the nearest neighbors, are classified, or classify the nearest neighbors of the data set as suitable for the pretraining, wherein for training of the model, the model is pretrained with at least one of the training data sets, which is classified as suitable for the pretraining, and the model for solving the task is subsequently trained with the data set.

6. A computer-implemented device for classifying data sets, the computer-implemented device having a processor that executes computer-readable instructions configured to:

predefine a model for solving a task;

predefine a plurality of training data sets;

define, for each training data set from the plurality of training data sets, a respective trained model for solving the task by pretraining the model on the training data set and training the model on a reference training data set;

determine a trained reference model for solving the task by training the model on the reference training data set without pretraining with the plurality of training data sets;

determine, for each respective trained model, a respective quality of solving the task;

determine, for the trained reference model, a reference quality of solving the task;

classify each respective trained model as suitable or unsuitable for the pretraining as a function of a deviation of the respective quality from the reference quality;

determine, in the plurality of training data sets, nearest neighbors of a data set of the plurality of training data sets; and either classify the data set as suitable or unsuitable for the pretraining as a function of how the trained models, which have been trained with the nearest neighbors, are classified, or classify the nearest neighbors of the data set as suitable for the pretraining, wherein the computer-readable instructions executed by the processor of the computer-implemented device are configured to classify the data set, and configured to determine the model for solving a task, which is trained or pretrained with the data set, when the data set is classified as suitable for the pretraining, and otherwise to determine the model without training or pretraining with the data set.

7. A non-transitory computer-readable medium on which is stored a computer program including computer-readable instructions for classifying data sets, the instructions, when executed by a computer, causing the computer to perform the following steps:
- predefining a model for solving a task;
- predefining a plurality of training data sets;
- defining, for each training data set from the plurality of training data sets, a respective trained model for solving the task by pretraining the model on the training data set and training the model on a reference training data set;
- determining a trained reference model for solving the task by training the model on the reference training data set without pretraining with the plurality of training data sets;
- determining, for each respective trained model, a respective quality of solving the task;
- determining, for the trained reference model, a reference quality of solving the task;
- classifying each respective trained model as suitable or unsuitable for the pretraining as a function of a deviation of the respective quality from the reference quality;
- determining, in the plurality of training data sets, nearest neighbors of a data set of the plurality of training data sets; and
- either classifying the data set as suitable or unsuitable for the pretraining as a function of how the trained models, which have been trained with the nearest neighbors, are classified, or classifying the nearest neighbors of the data set as suitable for the pretraining, wherein for training of the model, the model is pretrained with at least one of the training data sets, which is classified as suitable for the pretraining, and the model for solving the task is subsequently trained with the data set.

* * * * *